(12) United States Patent
Bertelsen

(10) Patent No.: US 6,691,580 B1
(45) Date of Patent: Feb. 17, 2004

(54) HIGH PRESSURE DEFLECTION TESTING SYSTEM AND METHODS OF MAKING THE SYSTEM

(75) Inventor: William D. Bertelsen, Bay City, MI (US)

(73) Assignee: Gougeon Brothers, Bay City, MI (US)

( * ) Notice: Subject to any disclaimer, the term of this patent is extended or adjusted under 35 U.S.C. 154(b) by 31 days.

(21) Appl. No.: 10/224,033

(22) Filed: Aug. 20, 2002

Related U.S. Application Data (60) Provisional application No. 60/324,657, filed on Sep. 25, 2001.

(51) Int. Cl.[7] .................................................. G01L 7/02
(52) U.S. Cl. ............................................................ 73/730
(58) Field of Search ................................ 73/729.2, 730, 73/731, 825, 850, 851, 852, 853, 854

(56) References Cited

U.S. PATENT DOCUMENTS

| | | | |
|---|---|---|---|
| 1,579,183 A | 3/1926 | Weiland | |
| 2,386,535 A | 10/1945 | Beinhoff | |
| 3,900,222 A | 8/1975 | Muller | |
| 3,938,840 A | 2/1976 | Haase et al. | |
| 4,535,976 A | 8/1985 | Dan et al. | |
| 4,625,933 A | 12/1986 | Luciano et al. | |
| 4,974,818 A | 12/1990 | Kato | |
| 5,431,061 A | * 7/1995 | Bertelsen et al. | ............. 73/852 |

\* cited by examiner

*Primary Examiner*—William Oen
(74) *Attorney, Agent, or Firm*—Reising, Ehtington, Barnes, Kisselle & Learman P.C.

(57) ABSTRACT

A testing fixture assembly induces a compound bend deflection in a test panel upon relative movement of opposing pressure applying parts. A panel holder has restraint members for receiving the edges of a test panel and a measuring device has an element for measuring the compound deflection induced in the panel. A liquid filled bladder formed of a pair of opposed pliant membranes is partitioned by a non-pliant plate and a bladder frame structure sandwiches the perimeter edge portions of the plate and membranes in tightly clamped relationship.

18 Claims, 7 Drawing Sheets

HIGH PRESSURE DEFLECTION TESTING SYSTEM AND METHODS OF MAKING THE SYSTEM

This invention claims the priority of U.S. provisional application Serial No. 60/324,657 filed Sep. 25, 2001 and relates to testing machines for measuring the effects of varied high pressure loadings on heavier gauge marine hull compositions and other rigid plate test panels.

FIELD OF THE INVENTION

BACKGROUND OF THE INVENTION

The present application is directed to a system of the general type described in U.S. Pat. No. 5,431,061 entitled DEFLECTION TESTING FIXTURE ASSEMBLY AND METHODS OF TESTING issued Jul. 11, 1995, which discloses and claims a system wherein the material being tested must withstand loads which:apply bends in the test panels in two dimensions along two axes simultaneously over a substantial area of surface.

While this machine has proven to work exceedingly well, it has not been possible to use it at much higher pressures to test heavier gauge marine hull multiple plywood and sandwich composite materials or to test more rigid and elongate test panels such as composite material bridge deck samples.

The present mechanism is particularly advantageous for testing the complex interactions between resin, fiber, and core that take place when a flat composite panel is forced to compoundly bend, or between resin and ply when a multi-ply wood sample is so flexed, and differs from the machine depicted in the patent mentioned in certain critical aspects and its ability to operate with more rigid materials.

SUMMARY OF THE INVENTION

The present invention is concerned with a machine which can utilize much higher pressures to test not only heavier gauge boat hull composites, but also a host of other rigid composites and other materials which may be used for such diverse purposes as, for example, bridge decks. Such decks may comprise spaced apart flat composite sheets with honeycomb or cellular cores bonding to them as an integral, part of them, and the test panels employed may be elongately rectangular in configuration.

Whereas, in the patent cited, the bladder or envelope was constructed of pliant membranes whose edges were joined in abutting relationship by a perimeter clamp frame, the present bladder incorporates a plate between the membranes with edges which separate the membrane edges and provide an edge composite assembly in which each membrane edge is tightly clamped against the intermediate plate in a manner to seal the bladder so liquid cannot escape, even when the bladder is subjected to pressures in the neighborhood of three times the pressures previously used. The plate stabilizes the clamp frame under these pressures and prevents the clamp frame from distorting out of its footprint and altering the shape of the distributed load during the test.

The prime object of the present invention is to retain the attributes of the previous testing machine, while permitting the machine to apply contact loads on more rigid materials to obtain the required load distributions over the contact areas.

Other objects and advantages of the invention will become apparent with reference to the accompanying drawings and the accompanying descriptive matter.

THE DRAWINGS

The presently preferred embodiment of the invention is disclosed in the following description and in the accompanying drawings, wherein.

DESCRIPTION OF THE PREFERRED EMBODIMENT

It needs to be understood that the machine involved in the present invention may be an MTS system machine of the character previously used which is capable of applying the heavier pressures to test panels which require the heavier pressures to deflect them.

As such, the machine includes an upper cross head 10 supported on vertically disposed columns 11 extending to the base B of the machine. In the present instance, the vertically movable cross head 10 is used in vertically stationary position. The heavier pressure load cell which is connected to cross head 10 has hydraulic grippers 13 for supporting the T member 14.

The member 14 supports the hollow pyramidal fixture 14a, which has a cap 15 bolted to the T member 14 as at 16. Below the fixture 14a is the MTS machine actuator plate or platen 17, which is hydraulically powered by the MTS machine to move upwardly at a controlled rate toward load cell 12. The actuator member 17 is supported by the base B on a support block 18 provided on the actuator 17 to receive a bladder or envelope, generally designated E, which, as illustrated, is of rectangular configuration. Upper and lower three ply rectangular membrane sections or sheets 19 and 20, respectively, are provided to form the bladder and are made up of, for example, food service, polyester belting, as previously. This belting may comprise polyester fabric sheets embedded in a nitrile, polyvinyl chloride core, and may be characterized as both pliant and moderately stretchable or elastic.

Figure 3:
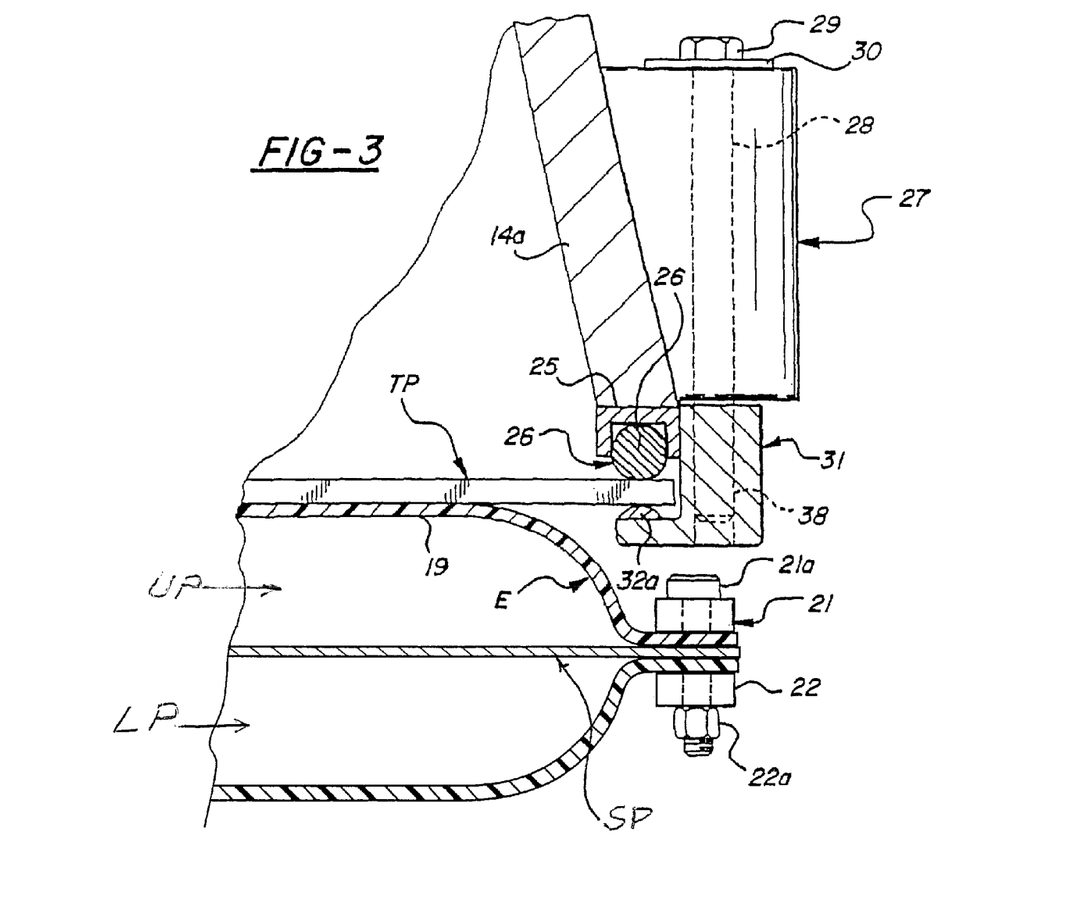
FIG. 3 is a greatly enlarged, fragmentary, sectional end elevational view showing a test panel in position ready for initiation of the test.

As FIG. 3 particularly indicates, an equalizing and stabilizing plate SP is provided between the upper and lower membrane sections 19 and 20 to partition them to form an upper chamber UP and a lower chamber LP. The equalizing plate SP which has the rectangular configuration of membranes 19 and 20 may be a stainless steel plate of about ⅛" in thickness, which is provided with liquid communicating openings O distributed in the pattern shown in FIG. 5.

Figure 4:
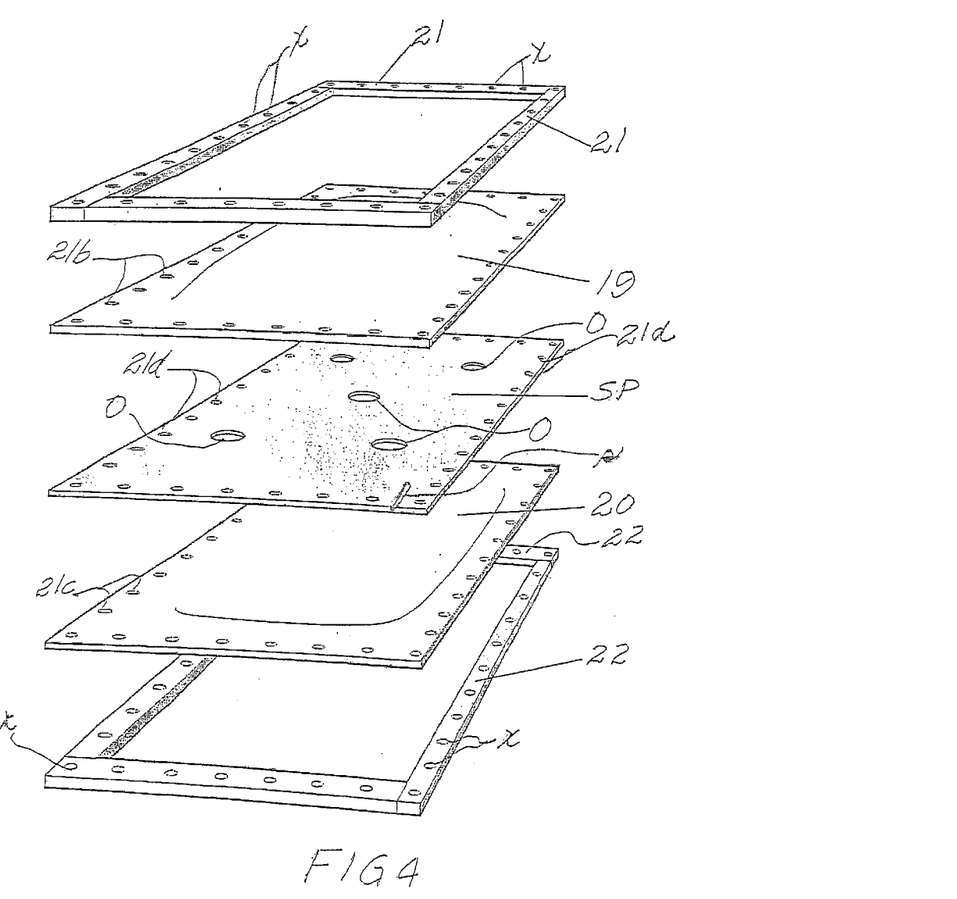
FIG. 4 is an exploded schematic perspective view of the liquid filled bladder component parts.

Dependent on the testing being performed, the configuration of the bladder could be otherwise, such as square. Openings O assist in the liquid filling operation and maintain equal water pressures in the upper and lower chambers during testing procedures. The perimeter edges of the membrane sections 19 and 20 are tightly clamped to the perimeter edges of the plate SP by open or skeletal upper and lower rectangular frames made of metal (i.e., steel), the end and side rails 21 and end and side rails 22, respectively having edge bolt openings x. The upper and lower frame rails 21 and 22 are tightly bolted together by closely spaced (i.e., one inch) bolts 21a secured by nuts 22a, the bolts 21a extending snugly through edge openings 21b and 21c in the membrane sections 19 and 20, respectively, and edge openings 21d in the stabilizing plate SP. It is essential that no leaks occur when the bladder or envelope E, which is filled with water or another incompressible liquid or substance, is subjected to the high pressures required. As FIG. 4 illustrates, the abutting pattern of the side and end bars 21 is different from the abutting pattern of the side and end bars 22 at each corner of the combined upper and lower frames so that upper and lower frame joints do not align and are not imbricated. The envelope or bladder E is completely filled and all air eliminated. In the present bladder, approximately five gallons of water is used. The water pressure can reach approximately 140 p.s.i. during testing, as opposed to 60 p.s.i. previously.

Figure 6:
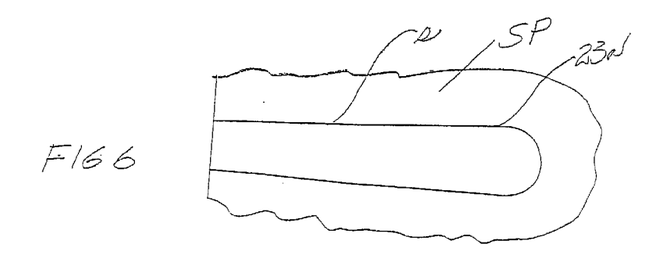
FIG. 6 is a top plan view illustrating the configuration of the probe groove in the equalizing plate.

At one side of the equalizing plate SP, a recess or groove s, which diverges slightly as at 23a at its laterally inner end, as shown in FIG. 6, is provided to house and support a probe 23 which extends into the interior of the upper chamber of the envelope E from a pressure sensor device 24. This device 24 may be the stainless steel probe part of the "Omega" pressure transducer sensor described in the aforementioned patent, which mounts to the frame rails 21 and 22 in the same manner as previously. The slot s accepts the open ended tubular probe 23 which may be adhesively secured in the slot s in a manner to leave its remote inner end open to the entrance of liquid. The slot s converges laterally in an outward direction so that if any of the adhesive should over time break away, it tends to only wedge back into the slot s. The slot s is positioned remotely from the corners of the plate SP and at an angle to diagonal lines connecting the corners.

For supporting the test panel TP in marine hull testing, a steel rod frame 26 may be used, as previously, along with the test panel holding frame assembly, generally designated 31, which may again have inwardly extending flanges 32 with bead members 32a for holding the test panel TP. Provided on the side walls of the fixture 14a at the corners are the anchor blocks, generally designated 27, which can have vertically extending openings 28 for receiving elongate bolt members 29, which bear on washers 30 and secure the panel frame assembly 31 in proper position. A linear variable differential transformer LVDT may be provided as previously and incorporates a core probe 39, which is normally maintained in extended position by the spring 40. The LVDT unit may be the Schaevitz device identified in the aforementioned patent (incorporated herein by reference) wherein the core is at the center or null position before the actuator 17 is moved upwardly to bulge the test panel TP. While the system is depicted as utilizing only a single envelope E mounted on platen 18, it is to be understood the platen shown may be readily altered to mount two or more side by side envelopes E to test elongate bridge deck test panels, for example. Also the MTS type machine may be arranged so that the test sample is under the envelope or envelopes, and the platen or actuator plate descends.

Figure 8:
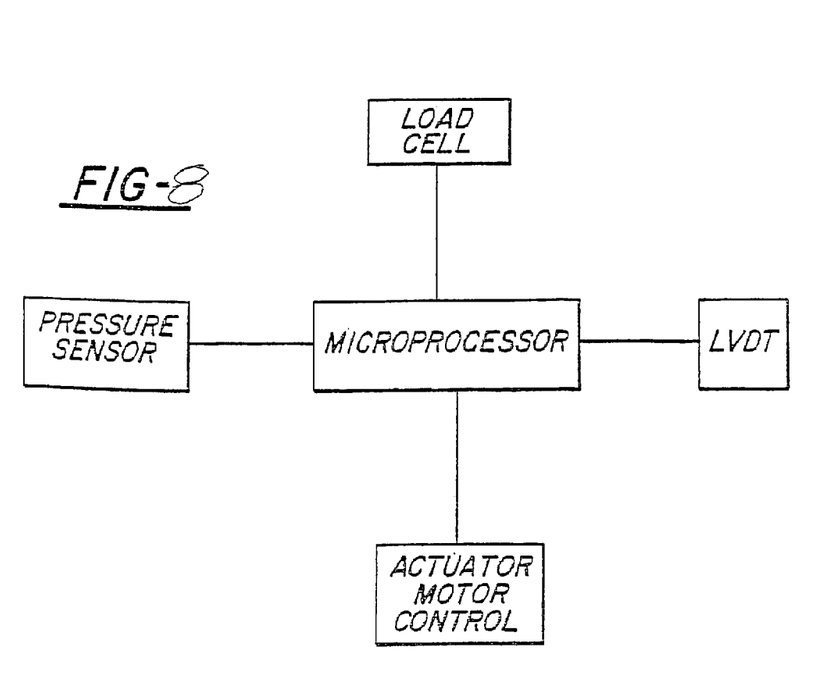
FIG. 8 is a schematic diagram identifying the various electronic components used in the test.

FIG. 8 portrays the various electronic components which are commonly employed in such testing systems. As previously, the signals from the pressure sensor 24, the LVDT device and the load cell 12 are fed to the MTS machine controller/computer, which further controls the hydraulic motor for raising the actuator 17 at a controlled rate of speed.

THE OPERATION

Figure 1:
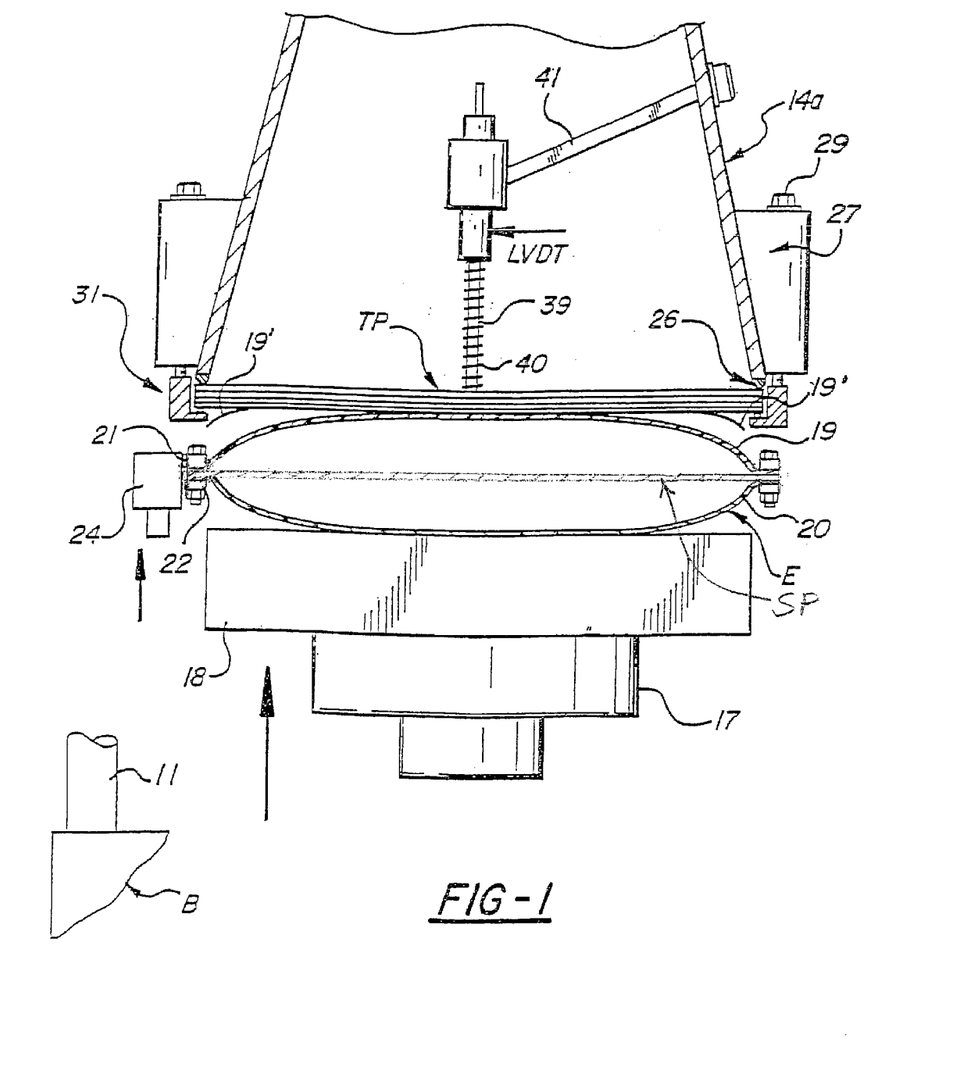
FIG. 1 is a fragmentary schematic sectional end elevational view of the lower end of the testing machine frame.
Figure 2:
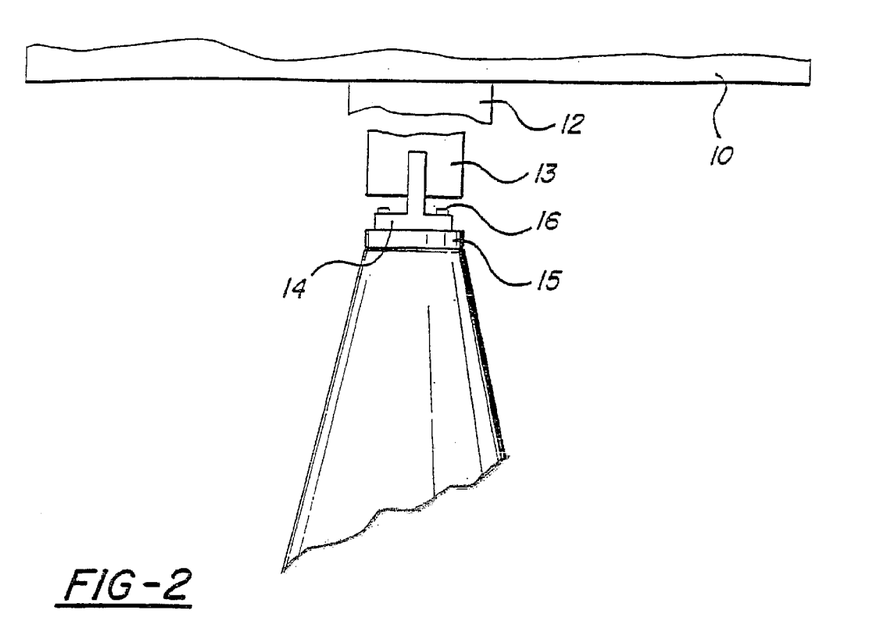
FIG. 2 is a fragmentary schematic end elevational view showing only the upper portion of the machine upper frame.

For purposes of simplicity, it will be assumed that only a single bladder E is being utilized in the test. With a predetermined volume of water in the envelope E, the MTS machine actuator plate 17 is moved upwardly from the position shown in FIG. 1 to induce a compound bend in the test panel TP. When the actuator plate 17 moves upwardly, the pliant upper wall 19 of the envelope E assumes the shape of the deflected panel TP when the plate 17 begins to press the envelope E against the lower surface of the test panel.

The water inside the envelope E will adjust so that the applied load is transferred evenly to all of the contacted panel area. The widely distributed pressure applied to the test panel TP produces the bulge which raises the core probe 39 at the same time the increase of pressure in the liquid in bladder E is linearly sensed by the pressure sensor device 24. The linear values recorded may be used to enable the production of graphs of the type shown in the previous patent. The system may also be well utilized in fatigue and failure testing operations.

When upward pressure or force is applied to the bladder E, the water pressure in the upper and lower bladder chambers remains equal. The plate SP is tensiley stressed, primarily in the directions of its corners. The side and end frame bars 21 and 22 brace against the flat equalizing plate SP and the membranes 19 and 20 are tightly pinched against the plate SP. The edge openings X, 21b, 21c, and 21d are all tightly sized to the diameter of bolts 21a, which may be quarter-inch bolts and closely spaced to cover the 12"×38" footprint of the membrane clamping-edge frame. This is a typical size, but other sizes are, of course, possible.

Figure 5:
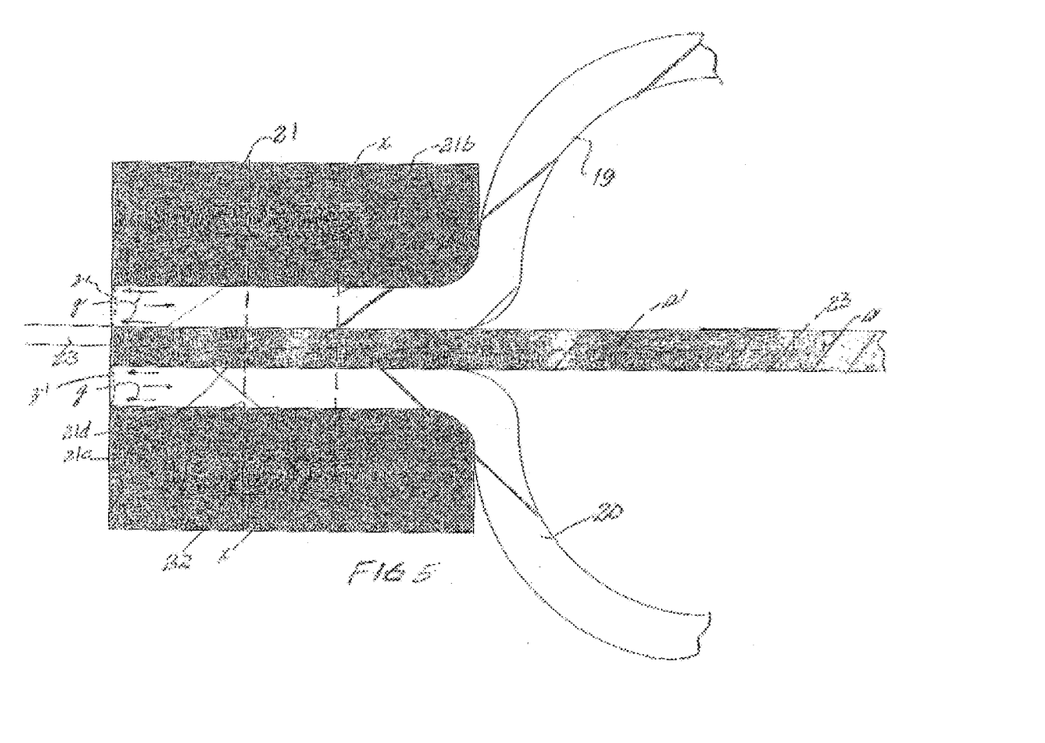
FIG. 5 is a greatly enlarged schematic fragmentary sectional side elevational view showing the pressure tube or probe carried in the equalizing plate.
Figure 7:
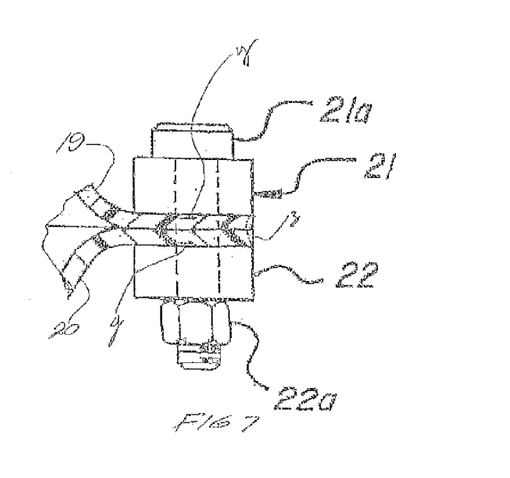
FIG. 7 is a schematic sectional fragmentary side elevational view illustrating the manner in which shear forces react on the former prior art edge construction.
Figure 7A:
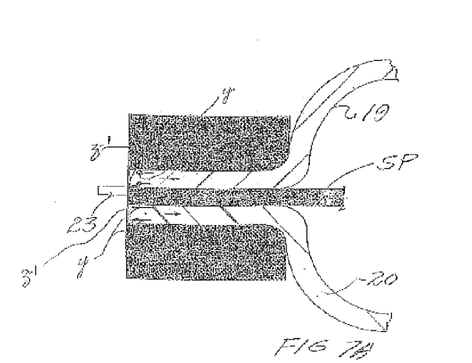
FIG. 7A is a sectional side elevational view illustrating shear forces reacting in the new edge clamping system.

Because the:membrane members 19 and 20 have some elasticity, they are subjected to shear forces as indicated by the arrows y in FIGS. 5, 7 and 7A, as pressures in the envelope E increase during the testing procedure. This tends to produce the edge distortion or buckle z when the membrane edges 19 and 20 abut as in prior art FIG. 7. When the edges membranes 19 and 20 do not abut and, rather engage the metal test plate SP, the split deflections z-1 are much decreased in amplitude. To avoid water reaching the bolts 21a, a seal must occur substantially laterally inwardly of the bolts 21a. In use, the deflections z or z-1 tend to pull on the membranes 19 and 20 and enlarge or stretch the openings 21b and 21c in a laterally inward direction. Under the shear forces imposed, the deflection buckle z, in FIG. 7, may be sufficient to induce a water leak in the FIG. 7 construction, while it would not be a problem under the same pressure in the FIG. 7A construction. Thus, the new envelope edge construction is clearly better suited to the high pressure testing which the present invention contemplates.

With considerably less shear deformation occurring with the FIG. 7A construction, the toll on the edge construction occurring over time with testing machine use is considerably less. In high pressure testing, it is important that both sides of each belting membrane 19 and 20 be engaged with a rigid surface to provide the improved pinching result. The bolts 21a are torqued in so as to be secured with the same pressure to provide uniformity around the edge construction perimeter. The prevention of shear displacement is further important in achieving uniformity in the distributed load fields during the test to avoid variables which would affect the test being carried out. While the contact area, of course, increases with the continued application of load, a stable pattern is desired throughout the range of loads utilized. It is important to maintain edge control and not alter the shape of the distributed load field under the higher pressures encountered.

The method of testing described herein has been successful in testing three by eight foot bridge deck sections made of reinforced concrete where the applied load was on the order of 55,000 pounds and the bladder pressure reached about 130 p.s.i. In other fracture tests a five inch thick slab of reinforced concrete was fractured by the device in a test to determine what loads would fracture the panel.

The disclosed embodiment is representative of a presently preferred form of the invention, but is intended to be illustrative rather than definitive thereof.

I claim:

1. In a method of testing the effect of distributed pressure loadings on test panels having opposing first and second sides bounded by a perimetral edge bordering adjacent flat edge portions of said sides in a testing machine for inducing a compound bend deflection in a test panel and having relatively movable parts which define a first relatively spread position and a second more closed position; a liquid filled self-contained bladder formed of pliant somewhat elastic membranes with membrane edge portions and adapted to be received on one of said parts for engaging said first side of a test panel and deflecting said test panel upon said relative movement of said parts; a fixture supported by the other of the parts incorporating a continuously extending edge movement restraint frame for receiving and contacting said adjacent edge portions of the sides of the test panel perimetrally inboard and adjacent the test panel's perimetral edge around both sides of the panel being tested, and a measuring device for measuring the deflection of said panel perimetrally inboard of said edge portions of the sides of the test panel as the latter is deflected under bladder distributed load upon said relative movement;

the improvement comprising: providing a substantially rigid partition with flat perimeter edge portions sandwiched between said membrane edge portions to reduce the shear force-induced inward buckle of said bladder and avoid liquid leak, prior to moving said parts toward said second more closed position at a controlled rate of speed to apply a distributed load to said test panel progressively in two dimensions along two axes simultaneously while measuring the amplitude of the said deflection of said test panel with said measuring device.

2. The method of claim 1 which includes recording the pressure of the liquid in said bladder and comparing the pressure with the amplitude of said deflection measured by said measuring device as said deflection is progressively imposed.

3. The method of claim 1 wherein said relative movement is carried out until rupture of the panel being tested occurs and the pressure of the liquid in the bladder is recorded.

4. The method of claim 1 comprising providing a plurality of openings in said partition to pass liquid to and from opposite sides of said partition.

5. In a testing system for producing a compound bend deflection in a test panel and recording the effects of progressively imposed pressure loading on the test panel and comprising:

a. a machine frame;
b. a pair of relatively movable machine parts mounted on said machine frame for relative movement from a first relatively spread position to a second more closed position;
c. a self-contained, liquid filled bladder, formed of pliant membranes with secured flat perimetral edge portions bounded by perimeter edges received on one of said parts for engaging said test panel inward of the perimetral edge of the test panel and deflecting said test panel compoundly as said parts assume said second more closed position;
d. a test panel holder supported by the other of said parts incorporating restraint members for releasably securing said test panel primetrally; and
e. a measuring device for measuring the amplitude of deflection induced in said panel by the bladder upon said movement to said second position;
the improvement comprising: a substantially rigid partition having a perimeter bordered by flat adjacent edge portions sandwiched between said membrane edge portions to reduce the shear force-induced inward buckle of said membrane perimeter edges under bladder compression load and avoid liquid leak.

6. The system of claim 5 wherein a plurality of openings are provided in said partition to pass liquid to and from opposite sides of said partition.

7. The system of claim 5 comprising providing sufficient opening area relative to said partition area to rapidly equalize pressure on opposite sides of said partition plate during fatigue testing.

8. The system of claim 5 wherein said partition is a plate placed in tension when said edge portions of said membranes and partitioning plate are tightly clamped and a compression load is applied to said bladder.

9. The system of claim 5 wherein a liquid pressure measuring device is provided and has a projecting probe, and said partition is a plate grooved on one side thereof to the perimeter of said plate to accommodate said probe on said liquid pressure measuring device without creating a gap.

10. The system defined in claim 9 wherein said probe is adhesively secured in said groove and said groove converges in a direction toward said perimetral edge of said partition.

11. The system of claim 8 wherein said partitioning plate is a solid member which is neither stretchable nor elastic.

12. A method of constructing a testing system for investigating the effects of various distributed pressure loadings on marine hull and other test panels with opposing first and second sides having a perimeter edge bordering adjacent edge portions, said system including a first part opposite a movable part with the first part and movable part being relatively movable to define a first relatively spread position and a second more closed position; a liquid filled self-contained bladder formed of opposed pliant membranes having an elastic property adapted to be supported by one of said parts, the membranes having perimeter edges bordered by flat edge portions; an edge movement restraint frame for receiving said adjacent edge portions of the test panel perimetrally inboard and adjacent the test panel perimetral edge around both sides of the test panel; and a measuring device for measuring the deflection of the compound bend induced in the test panel perimetrally inboard of the test panel's perimeter edge by the bladder upon said relative movement to said second position, the improvement comprising: providing said bladder with a pressure equalizing plate having openings therein and with its perimeter edges tightly sandwiched between said membrane edge portions and reducing the shear force-induced perimetrally inward buckle of said membrane edges to avoid liquid leak under load.

13. The method of claim 12 comprising providing sufficient opening area relative to said plate area to rapidly equalize pressure on opposite sides of said partitioning plate during fatigue testing.

14. The method of claim 12 comprising placing said partitioning plate in tension when said edge portions of said membranes and partitioning plate are tightly clamped and a compression load is applied to said bladder.

15. The method of claim 12 comprising providing a pressure measuring device with a projecting probe, and grooving said partitioning plate on one side thereof to the perimeter of said plate to accommodate said probe on said measuring device without creating a gap.

16. The method of claim 15 comprising adhesively securing said probe in said groove and providing a groove which converges in a direction toward said perimetral edge of said partitioning plate.

17. The method of claim 12 wherein said partitioning plate is neither stretchable or elastic.

18. In a testing fixture assembly for inducing a compound bend deflection in a panel being tested which has opposing sides bounded by a perimeter edge, the testing assembly being used with a support frame element opposite a platen which is relatively movable with respect to the support frame element from a first relatively spread position to a second more closed position;

a. a panel holder adapted to be supported by the frame element at a spaced distance from the platen and incorporating edge movement restraint members for receiving a panel to be tested;

b. a measuring device having a deflection measuring element for measuring the deflection induced in the panel upon said relative movement of the platen and support frame element;

c. a liquid filled, self-contained bladder formed of a pair of opposed pliant membrane members partitioned by a non-pliant plate of the general configuration of the membrane members, both the membrane members and plate having perimeter edge portions; and     d. a bladder frame structure sandwiching the perimeter edge portions of the plate and membranes in tightly clamped relationship.

\* \* \* \* \*